US012772122B2

(12) United States Patent
Sha et al.

(10) Patent No.: US 12,772,122 B2
(45) Date of Patent: Oct. 20, 2026

(54) HANDOVER SCHEMES FOR USER AGGREGATION SCENARIO IN WIRELESS COMMUNICATIONS

(71) Applicant: ZTE Corporation, Shenzhen (CN)

(72) Inventors: Xiubin Sha, Shenzhen (CN); Bo Dai, Shenzhen (CN); Ting Lu, Shenzhen (CN); Li Niu, Shenzhen (CN); Jie Tan, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 227 days.

(21) Appl. No.: 18/641,907

(22) Filed: Apr. 22, 2024

(65) Prior Publication Data

US 2024/0276314 A1 Aug. 15, 2024

Related U.S. Application Data

(63) Continuation of application No. PCT/CN2021/132249, filed on Nov. 23, 2021.

(51) Int. Cl.

*H04W 36/00* (2009.01)
*H04W 36/30* (2009.01)
*H04W 92/20* (2009.01)

(52) U.S. Cl.

CPC . *H04W 36/0058* (2018.08); *H04W 36/00835* (2018.08); *H04W 36/30* (2013.01); *H04W 92/20* (2013.01)

(58) Field of Classification Search

CPC ....... H04W 36/0058; H04W 36/00835; H04W 36/30; H04W 92/20; H04W 88/04;

(Continued)

(56) References Cited

U.S. PATENT DOCUMENTS 10,743,232 B1 8/2020 Mehta et al.
2017/0055187 A1* 2/2017 Kang .............. H04W 36/00837

(Continued)

FOREIGN PATENT DOCUMENTS

CN 110178405 8/2019
CN 110419234 11/2019

(Continued)

OTHER PUBLICATIONS

Extended European Search Report for co-pending EP Application, Report dated Oct. 16, 2024, 19 pages.

(Continued)

*Primary Examiner* — Steven Hieu D Nguyen

(74) *Attorney, Agent, or Firm* — Ashurst Perkins Coie US LLP

(57) ABSTRACT

A method of wireless communication is described. The method includes transmitting, by a first network node, a configuration message to a first communication device in communication with a second communication device to perform an aggregation operation, the configuration message including at least one of: first configuration information about a first radio link between the first network node and the first communication device, second configuration information about a second radio link between the first communication device and the second communication device; receiving, from the first communication device, a measurement report that includes at least one of first measurement information of the first radio link, or second measurement information of the second radio link; and determining, based on the measurement report, whether to perform a handover operation from the first network node to a second network node.

14 Claims, 10 Drawing Sheets

(58) Field of Classification Search
CPC ......... H04W 36/0064; H04W 36/0069; H04W 36/03; H04W 76/14; H04W 76/15; H04W 76/34; H04W 4/16; H04W 36/0044; H04W 36/0061; H04W 36/385
See application file for complete search history.

(56) References Cited

U.S. PATENT DOCUMENTS

| | | | | |
|---|---|---|---|---|
| 2018/0227821 | A1 | 8/2018 | Tsai et al. | |
| 2021/0385714 | A1* | 12/2021 | Paladugu | H04W 36/0009 |
| 2022/0039082 | A1* | 2/2022 | Belleschi | H04W 4/021 |
| 2022/0377822 | A1* | 11/2022 | Wang | H04W 76/14 |
| 2023/0131538 | A1* | 4/2023 | Shimoda | H04W 48/18 455/422.1 |
| 2024/0129820 | A1* | 4/2024 | Mochizuki | H04W 36/033 |
| 2024/0205764 | A1* | 6/2024 | Paladugu | H04W 36/035 |

FOREIGN PATENT DOCUMENTS

| | | |
|---|---|---|
| WO | 2018/201487 | 11/2018 |
| WO | 2019/023857 | 2/2019 |

OTHER PUBLICATIONS

International Search Report and Written Opinion for PCT/CN2021/132249, filed Nov. 23, 2021, Report dated Aug. 8, 2022, 9 pages.
Ericsson "Reporting RLM related issues upon handover and access to the target cell" 3GPP TSG-RAN WG3 #103 R3-190834, Athens, Greece, Feb. 25-Mar. 1, 2019, 6 pages.
CIPC, Notice of Acceptance for South African Application No. 2024/02828, mailed on May 30, 2025, 1 page.
Office Action for co-pending Korean Patent Application No. 10-2024-7013305, dated Jul. 24, 2026, 18 pages with unofficial English translation.

* cited by examiner

HANDOVER SCHEMES FOR USER AGGREGATION SCENARIO IN WIRELESS COMMUNICATIONS

CROSS-REFERENCE TO RELATED APPLICATION

This application is a continuation and claims priority to International Application No. PCT/CN2021/132249, filed on Nov. 23, 2021, the disclosure of which is hereby incorporated by reference herein in its entirety.

TECHNICAL FIELD

This patent document generally relates to systems, devices, and techniques for wireless communications.

BACKGROUND

Wireless communication technologies are moving the world toward an increasingly connected and networked society. The rapid growth of wireless communications and advances in technology has led to greater demand for capacity and connectivity. Other aspects, such as energy consumption, device cost, spectral efficiency, and latency are also important to meeting the needs of various communication scenarios. In comparison with the existing wireless networks, next generation systems and wireless communication techniques need to provide support for an increased number of users and devices.

SUMMARY

This document relates to methods, systems, and devices for handover schemes for a user device in an user device aggregation scenario.

In one aspect, a wireless communication method is disclosed. The wireless communication method includes transmitting, by a first network node, a configuration message to a first communication device in communication with a second communication device to perform an aggregation operation, the configuration message including at least one of: first configuration information about a first radio link between the first network node and the first communication device, second configuration information about a second radio link between the first communication device and the second communication device; receiving, from the first communication device, a measurement report that includes at least one of first measurement information of the first radio link, or second measurement information of the second radio link; and determining, based on the measurement report, whether to perform a handover operation from the first network node to a second network node.

In one aspect, a wireless communication method is disclosed. The wireless communication method includes receiving, by a target network node, a handover request message to request a handover operation from a source network node serving a first communication device to the target network node, the handover request message including aggregation information related to an aggregation operation between the first communication device and a second communication device served by another network node; and establishing, by the target network node, a connection between the target network node and the another network node.

In one aspect, a wireless communication method is disclosed. The wireless communication method includes receiving, by a first communication device in communication with a second communication device to perform an aggregation operation, a configuration message from a first network node, the configuration message including at least one of: first configuration information about a first radio link between the first network node and the first communication device, second configuration information about a second radio link between the first communication device and the second communication device; and transmitting, from the first communication device to the first network node, a measurement report that includes at least one of first measurement information of the first radio link, or second measurement information of the second radio link In another aspect, a communication apparatus comprising a processor configured to implement the above-described method is disclosed. These, and other features, are described in the present document.

DETAILED DESCRIPTION

The disclosed technology provides implementations and examples of handover schemes for a user device in an user device aggregation scenario.

In radio communications, various types of services such as augmented reality (AR), virtual reality (VR), video with high pixels, are available, which may have a large data rate and/or need a large transmission bandwidth (e.g. eMBB service). It is very difficult for a single user equipment (UE) to provide such large data rate and/or large transmission bandwidth. If the single UE has a limited capability such as a sensor UE, it becomes more difficult to meet the data rate and transmission bandwidth required for the services. Furthermore, the UE may be almost impossible to provide enough large data rate at the cell edge because the UE transmission power may be limited at the cell edge. If multiple UEs can be aggregated to transmit and/or receive, the large data rate and/or large transmission bandwidth can be obtained. In this case, one UE is used as the primary UE or anchor UE, which can connect with the application layer or data network (DN), and one or more other UEs are used as the secondary UEs or non-anchor UEs, which can assist the primary UE or anchor UE to transmit and/or receive user data. In this patent document, the term, "primary UE" is used interchangeably with the term, "anchor UE" and the term, "secondary UE" is used interchangeably with the term, "non-anchor UE".

When multiple UEs are aggregated to perform the transmission and/or reception of data, the mobility issue occurs, e.g., how to perform handover procedures for a primary UE and a secondary UE. Various implementations of the disclosed technology suggest handover schemes for a primary UE and a secondary UE when the primary UE and the secondary UE are aggregated together.

Implementation 1—Secondary UE Handover Procedure Over Xn Interface

Figure 1:
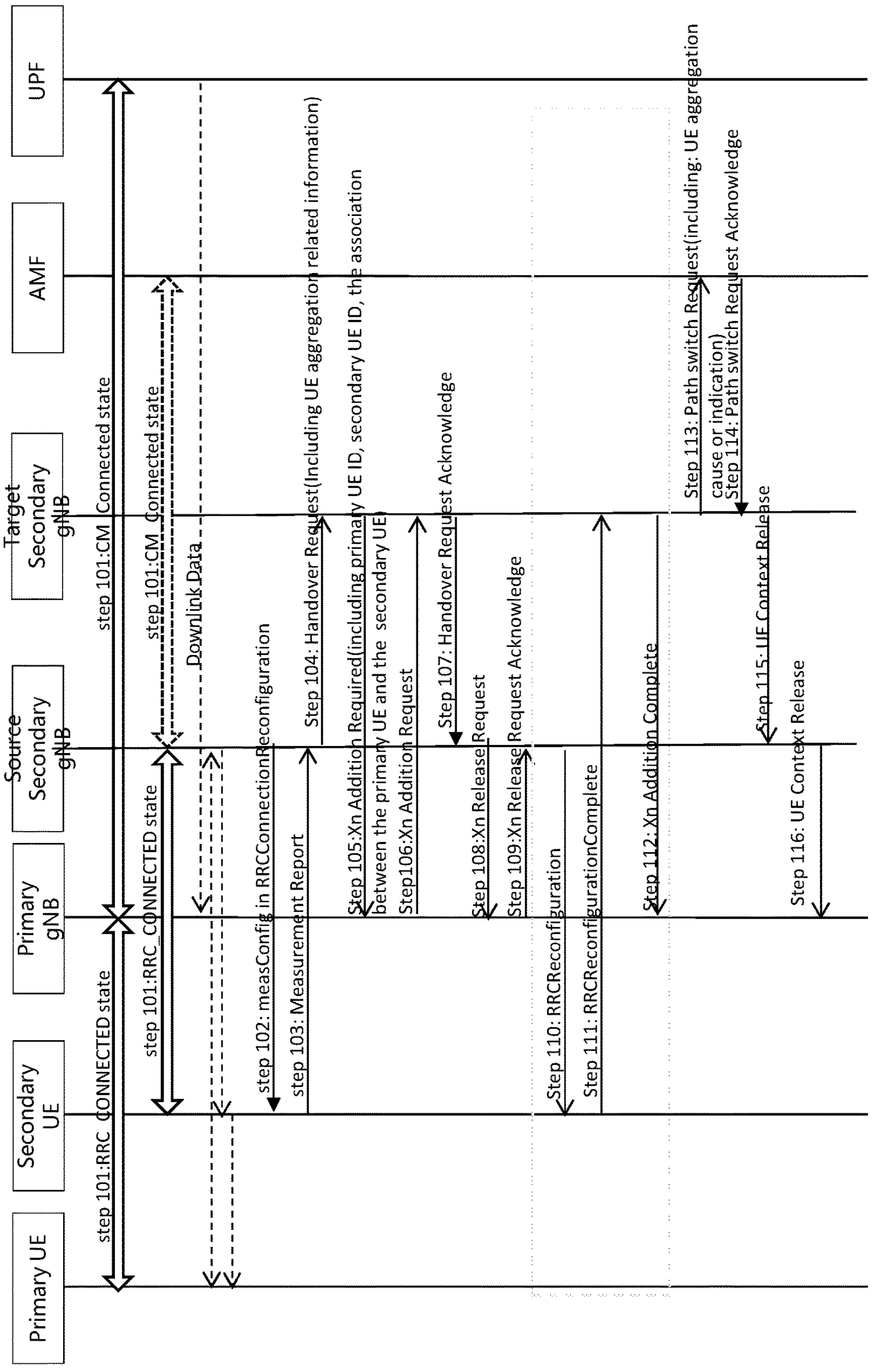
FIG. 1 shows a secondary UE handover procedure over an Xn interface based on some implementations of the disclosed technology.

FIG. 1 shows an example of a secondary UE handover procedure over Xn interface when the primary UE and the secondary UE are aggregated for data transmission and/or receptions. The secondary UE handover procedure refers to the secondary UE handover procedure from the source secondary gNB to the target secondary gNB, while the secondary UE is connected with the source secondary gNB.

Operation 101: The data transmission and/or reception is performed using the UE aggregation technique. At the operation 101, the UE aggregation procedure has been established. The aggregation technique allows at least two UEs, e.g., the primary UE and the secondary UE, to cooperate to transmit and/or receive data. In which, the secondary UE has RRC connection, but may has or has not CM (Connection Management) connection. When the secondary UE has CM connection, it also has AS security established. When the secondary UE has not CM connection, it also has not AS security established or use the primary UE's AS Security, and the following step 113 and step 114 are not necessary.

Operation 102: The source secondary gNB provides a configuration message including measurement configuration information to the secondary UE that it serves. In some implementations, the configuration message can be sent to the secondary UE directly (e.g. by measurement configuration information included in RRCConnectionReconfiguration). In some other implementations, the configuration message can be sent to the secondary UE indirectly via the primary gNB and the primary UE. For example, the secondary gNB sends the measurement configuration information to the primary gNB by Xn signalling, the primary gNB sends the measurement configuration information included in RRCConnectionReconfiguration to the primary UE, and then the primary UE sends the measurement configuration information to the secondary UE via a link such as a sidelink (SL) of NR, Wifi, Bluetooth, or a wireline link.

In some implementations, the configuration message includes at least one of following: 1) the measurement configuration information of a first radio condition between the secondary UE and the gNB (e.g., the source secondary gNB, the target secondary gNB, any neighboring gNB, or any cell of the gNB), 2) the measurement configuration information of a second radio condition between the secondary UE and the primary UE, or 3) the neighbor cell list that supports UE aggregation technique. In this implementation and other implements discussed in this patent document, the radio condition may correspond to a condition of a radio link if a corresponding link is formed between two elements or refer to a condition of radio resources if any link is not formed between two elements. In some implementations, the second radio condition between the secondary UE and the primary UE may be at least one of side link (SL) of new radio (NR), a wireless link using Internet such as Wi-Fi, a short-range wireless link such as Bluetooth, or a wireline link.

In some implementations, the measurement configuration information of the second radio condition between the secondary UE and the primary UE includes at least one of: a quality threshold for determining whether the second radio condition can support any services, the quality hysteresis to evaluate the radio link, the trigger timer to evaluate the radio link. For example, if the second radio condition has the quality value less than the quality threshold, it is determined that the second radio condition is not suitable for providing the services and thus not used for providing the services. In some implementations, the measurement configuration information of first radio condition between the secondary UE and the source secondary gNB includes measurement configuration that is used in NR for mobility control of the secondary UE.

In some implementations, the neighbor cell list including cell(s) that supports the UE aggregation technique is included in the configuration message. In some implementations, the neighbor cell list can include cells supporting the UE aggregation technique. In some implementations, the indication indicating the UE aggregation technique support capability can be included for a cell in the neighbor cell list such that no indication implicitly indicates that the corresponding cell does not support the UE aggregation technique. In some implementations, the UE configured with the UE aggregation technique is configured to measure a cell included in the neighbor cell list.

Operation 103: The secondary UE reports a measurement report to the source secondary gNB. In some implementations, the measurement report includes at least one of followings: the measurement information of the first radio condition between the secondary UE and the gNB, or the measurement information of the second radio condition between the secondary UE and the primary UE.

Upon receiving the measurement report, the source secondary gNB determines whether to remove the secondary UE from the UE aggregation technique or perform the handover procedure to the target secondary gNB for the secondary UE. For example, when the measurement report indicates the quality of the second radio condition between the secondary UE and the primary UE is too worse to bear any service, the source secondary gNB will trigger to remove the secondary UE from the UE aggregation technique. In this case, the source secondary gNB does not proceed the operation 104.

Operation 104: The source secondary gNB sends a handover request to the target secondary gNB. For example, when the measurement report indicates the radio quality between the secondary UE and the target secondary gNB is better than the radio quality between the secondary UE and the source secondary gNB, and the quality of the second radio condition between the secondary UE and the primary UE is not too worse to bear the service (e.g. the UE has not report the radio quality between the secondary UE and the primary UE)), the source secondary gNB triggers to transmit the handover request message to handover the secondary UE to the target secondary gNB (as indicated in the operation 104). In some implementations, the secondary UE is configured to report the quality of the radio link between the secondary UE and the primary UE when the quality of the second radio condition between the secondary UE and the primary UE is too worse. For example, if the secondary UE has not report the quality of the second radio condition between the secondary UE and the primary UE, it is considered that the quality of the second radio condition between the secondary UE and the primary UE is not too worse to bear the service.

In some implementations, the handover request includes the UE aggregation related information. The UE aggregation related information includes at least one of: UE aggregation cause or UE aggregation indication, the secondary UE ID, the primary UE ID, the cell ID that the primary UE camps, the gNB ID that the primary UE camps, the secondary UE's TNL address related configuration information, the primary UE's TNL address related configuration information. For example, the UE aggregation indication usually is an information element (IE) with 1 bit (e.g. UE aggregation indication with value of: TRUE or FALSE) and the UE aggregation cause extends the existing cause value to indicate the UE aggregation technique case. If there are more than one secondary UE, the secondary UE information can be included in an information list.

Operations 105 and 106: The target secondary gNB triggers to establish the connection between the primary gNB and the target secondary gNB for the secondary UE. If there are more than one secondary UEs reside in different gNBs, multiple connections may be established. If two UEs reside in the same gNB, one connection can be shared or two connections share the same connection establishment procedure. At operation 105, the target secondary gNB triggers Xn establishment (to establish the UE's Xn tunnel between the primary gNB and the target secondary gNB.). e.g. the secondary gNB sends Xn Addition Required message including UE aggregation related info to the primary gNB. In some implementations, the UE aggregation related info includes at least one of the following: a primary UE ID, a secondary UE ID, the association between the primary UE and the secondary UE. At operation 106, the primary gNB responses with the Xn Addition Request including UE aggregation configuration to the target secondary gNB.

Operation 107: The target secondary gNB sends a handover request acknowledgement to the source secondary gNB.

Operations 108 and 109: The source secondary gNB triggers to release the connection between the primary gNB and the source secondary gNB for the secondary UE. At operation 108, the source secondary gNB sends a Xn Release Request to release the connection between the primary gNB and the source secondary gNB for the secondary UE. At operation 109, the primary gNB sends a Xn Release Request Acknowledgement to the source secondary gNB.

Operation 110: The source secondary gNB sends RRCReconfiguration to the secondary UE to trigger the secondary UE to handover from the source secondary gNB to the target secondary gNB. In some implementations, the RRCReconfiguration can be sent to the UE directly or sent to UE via primary gNB and primary UE indirectly. When the RRCReconfiguration is sent to the UE indirectly, the secondary gNB sends the RRCReconfiguration to primary gNB by container in Xn signalling, the primary gNB sends the RRCReconfiguration by container included in secondary RRCReconfiguration to the primary UE, and then the primary UE sends the RRCReconfiguration to the secondary UE via a radio link such as a SL (sidelink) of NR, Wifi, Bluetooth, or wireline link.

Operation 111: The secondary UE sends RRCReconfigurationComplete to the target secondary gNB.

Operation 112: The target secondary gNB sends an Xn addition complete message to the secondary gNB to indicate the handover completion of the secondary UE from the source secondary gNB to the target secondary gNB.

Operation 113 and 114: The target secondary gNB triggers the path switch procedure. At operation 113, the target secondary gNB sends, to an access and mobility management function (AMF), a path switch request including an UE aggregation cause or an UE aggregation indication to indicate that the UE is only perform the UE aggregation technique as a secondary UE and/or the path does not trigger a user plain connection establishment with UPF. Thus, the path switch request requests the AMF to switch the user plain path from the source secondary gNB to the target secondary gNB. At operation 114, the AMF sends a path switch request acknowledgement to the target secondary gNB.

Operation 115: The target secondary gNB sends a UE context release message to the source secondary gNB to release the Xn control resource between the primary gNB and the source secondary gNB(s).

Operation 116: The source secondary gNB sends a UE context release message to the primary gNB to release the Xn control resource between the primary gNB and the source secondary gNB(s).

The operations described above are examples only and can be modified in various manners. For example, the operations above can be reordered (e.g. the operations 105 to 109 can be performed after the operation 111). Some of the operations, e.g. the operations 115 and 116, can be omitted. Some operations are combined, e.g. the operations 115 and 116 can be combined with operations 108 and 109.

The Xn related messages (e.g. Xn addition required, Xn addition request, Xn Release Request, Xn Release Request Acknowledge, Xn Addition Complete, etc) can be S-Node related messages (S-Node addition required, S-Node addition request, S-Node Release Request, S-Node Release Request Acknowledge, S-Node Addition Complete, etc) or new defined UE specific Xn interface message.

Implementation 2—Secondary UE Handover Procedure Over NG Interface

Figure 2:
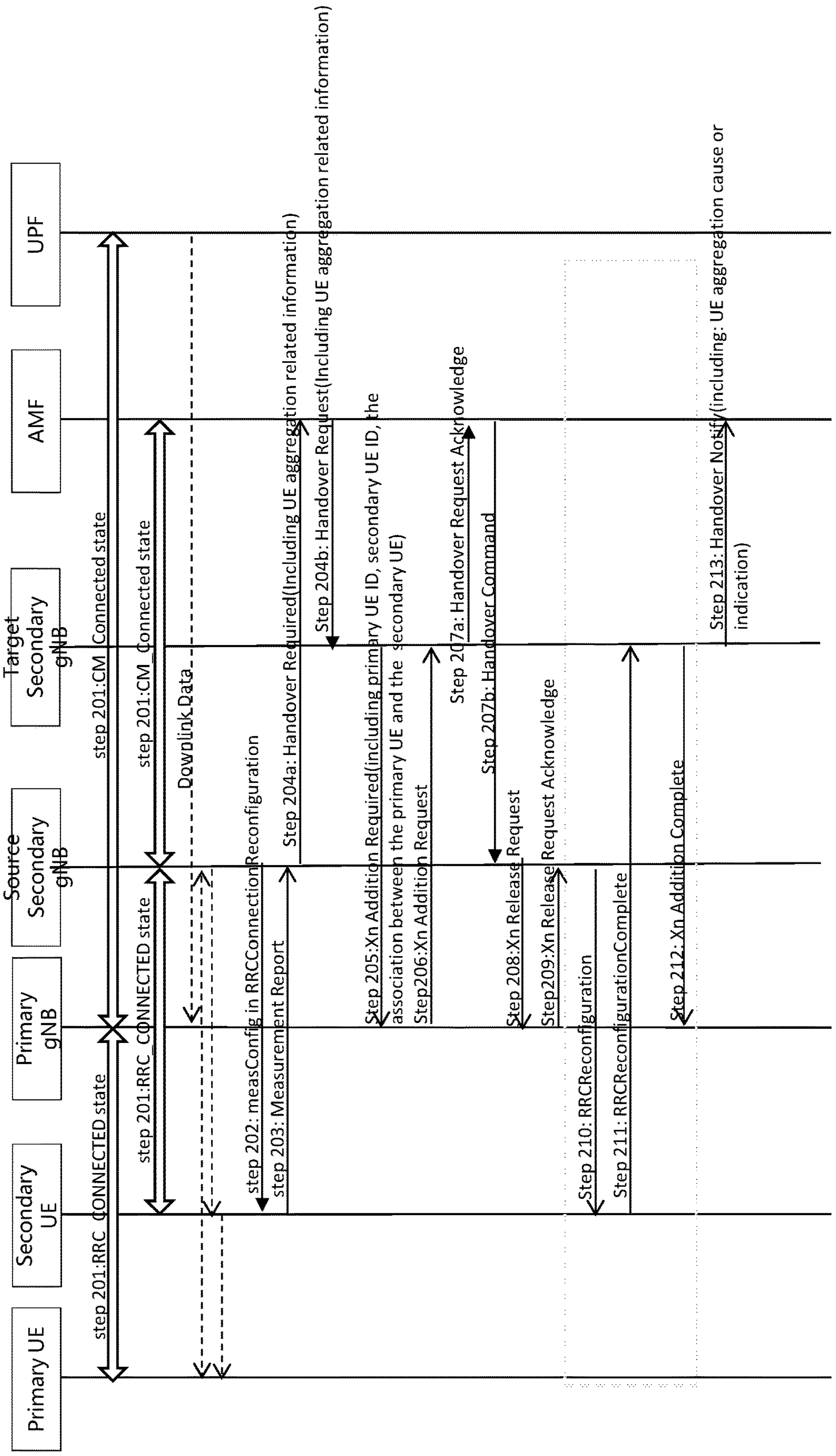
FIG. 2 shows a secondary UE handover procedure over an NG interface based on some implementations of the disclosed technology.

FIG. 2 shows the secondary UE handover procedure over NG interface while UE is aggregated for data transmission and/or reception. Since the secondary UE handover procedure over the Xn interface has been already discussed with reference to FIG. 1, the descriptions here are focused on the differences from those of the secondary UE handover procedure over the Xn interface as described with reference to FIG. 1.

Operations 201 to 203: The operations 201 to 203 are same as the operations 101 to 103 as shown in FIG. 1.

Upon receiving the measurement report, the source secondary gNB determines whether to remove the secondary UE from the UE aggregation technique or perform the handover procedure to the target secondary gNB for the secondary UE. For example, when the measurement report indicates the quality of the second radio condition between the secondary UE and the primary UE is too worse to bear any service, the source secondary gNB will trigger to remove the secondary UE from the UE aggregation technique. In this case, the source secondary gNB does not proceed the operation 204*a*.

Operations 204*a* and 204*b*: At operation 204*a*, the source secondary gNB sends a handover required message to AMF. For example, when the measurement report indicates the radio quality between the secondary UE and the target secondary gNB is better than the radio quality between the secondary UE and the source secondary gNB, and the quality of the second radio condition between the secondary UE and the primary UE is not too worse to bear the service (e.g. the UE has not report the radio quality between the secondary UE and the primary UE), the source secondary gNB triggers to transmit the handover required message to handover the secondary UE to the target secondary gNB (as indicated in the operation 204*a*). In some implementations, the secondary UE is configured to report the quality of the radio link between the secondary UE and the primary UE when the quality of the second radio condition between the secondary UE and the primary UE is too worse. For example, if the secondary UE has not report the quality of the second radio condition between the secondary UE and the primary UE, it is considered that the quality of the second radio condition between the secondary UE and the primary UE is not too worse to bear the service. At operation 204*b*, the AMF sends the handover request message to the target secondary gNB. Both of the handover required message and the handover request message include the UE aggregation related information. In some implementations, the UE aggregation related information includes at least one of: an UE aggregation cause or an UE aggregation indication, the primary UE ID, the cell ID that the primary UE camps, the gNB ID that the primary UE camps, TNL address related configuration information.

Operations 205 and 206: The operations 205 and 206 are same as the operations 105 and 106 as shown in FIG. 1.

Operations 207*a* and 207*b*: The connection has been established between the primary gNB and the target secondary gNB for the secondary UE. At the operation 207*a*, the target secondary gNB sends a handover request acknowledgement to the AMF. At the operation 207*b*, the AMF sends a handover command message to the source secondary gNB.

Operations 208 to 212: The operations 208 to 212 are same as the operations 108 to 112 as shown in FIG. 1.

Operation 213: The target secondary gNB sends a handover notification message to AMF to indicate the completion of handover. In some implementations, the handover notification message includes an UE aggregation cause or an UE aggregation indication to indicate that the UE is only perform the UE aggregation technique as a secondary UE and/or that the message does not trigger a user plain connection establishment with UPF.

Implementation 3—Primary UE Handover Procedure Over Xn Interface

Figure 3:
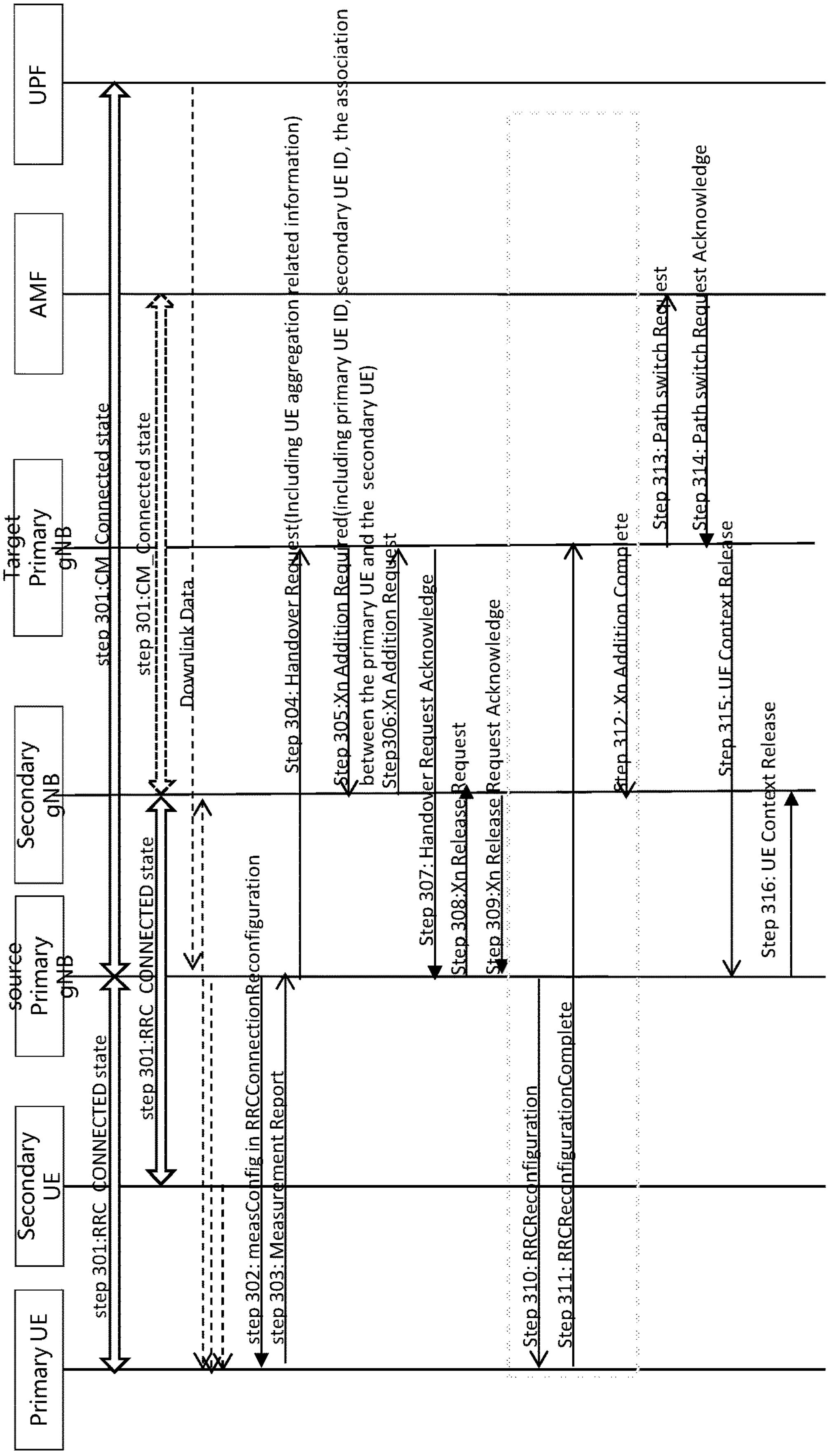
FIG. 3 shows a primary UE handover procedure over an Xn interface based on some implementations of the disclosed technology.

FIG. 3 shows an example of a primary UE handover procedure over Xn interface when the primary UE and the secondary UE are aggregated for data transmission and/or receptions. The primary UE handover procedure refers to the handover procedure from the source primary gNB to the target primary gNB, while the primary UE is connected with the source primary gNB.

Operation 301: The data transmission and/or reception is performed using the UE aggregation technique. At the operation 301, the UE aggregation procedure has been established. The aggregation technique allows at least two Ues, e.g., the primary UE and the secondary UE, to cooperate to transmit and/or receive data. In which, the secondary UE has RRC connection, but may has or has not CM connection. When the secondary UE has CM connection, it also has AS security established; When the secondary UE has not CM connection, it also has not AS security established or use the primary UE's AS Security, and the following step 313 and step 314 are not necessary.

Operation 302: The source primary gNB provides a configuration message including measurement configuration information to the primary UE that it serves. In some implementations, the configuration message can be sent to the primary UE directly. In some implementations, the configuration message includes at least one of following: the measurement configuration information of a first radio condition between the primary UE and the gNB (e.g., the source gNB, the target gNB, any neighboring gNB, or any cell of the gNB), or the measurement configuration information of a second radio condition between the secondary UE and the primary UE. In some implementations, the second radio condition between the secondary UE and the primary UE may be at least one of side link (SL) of new radio (NL), a wireless link using Internet such as Wi-Fi, or a short-range wireless link such as Bluetooth.

In some implementations, the measurement configuration information of the second radio link between the secondary UE and the primary UE includes at least one of: a quality threshold for determining whether the second radio condition can support any services, the quality hysteresis to evaluate the radio link, the trigger timer to evaluate the radio link. For example, if the second radio links has the quality value less than the quality threshold, it is determined that the second radio link cannot be used for providing the services. In some implementations, the measurement configuration information of first radio condition between the primary UE and the gNB includes measurement configuration that is used in NR for mobility control of the primary UE.

Operation 303: The UE reports a measurement report to the source primary gNB. In some implementations, the measurement report includes at least one of followings: the measurement information of the first radio condition between the primary UE and the gNB, or the measurement information of the second radio condition between the secondary UE and the primary UE.

Upon receiving the measurement report, the primary UE determines whether to trigger to remove the secondary UE from the UE aggregation technique or perform the handover procedure to the target primary gNB for the primary UE. For example, when the measurement report indicates the quality of the second radio condition between the secondary UE and the primary UE is too worse to bear any service, the source primary gNB will trigger to remove the secondary UE from the UE aggregation technique. In this case, the source primary gNB does not proceed the operation 304.

Operation 304: The source primary gNB sends a handover request to the target primary gNB. Upon receiving the measurement report that indicates to handover the primary UE from the source primary gNB to the target primary gNB, the source primary gNB triggers to handover the primary UE to the target primary gNB. For example, the source primary gNB triggers to transmit the handover request message to handover the primary UE when quality of the radio link between the primary UE and the target primary gNB is better than the quality of the first radio quality between the primary UE and the source primary gNB, and the quality of second radio quality between the secondary UE and the primary UE is not too worse to bear the service. For example, if the primary UE has not report the quality of the quality of the radio link between the secondary UE and the primary UE, it is considered that the quality of the second radio condition between the secondary UE and the primary UE is not too worse to bear the service.

In some implementations, the handover request includes the UE aggregation related information. The UE aggregation related information includes at least one of: an UE aggregation cause or an UE aggregation indication, the secondary UE ID, the cell ID that the secondary UE camps, the gNB ID that the secondary UE camps, the secondary UE's TNL address related configuration information. If there are more than one secondary UE, the secondary UE information can be included in an information list.

Operations 305 and 306: The target primary gNB triggers to establish the connection between the target primary gNB and the secondary gNB for the primary UE. If there are more than one secondary UEs reside in different gNBs, multiple connections may be established. If two UEs reside in the same gNB, one connection can be shared or two connections share the same connection establishment procedure. At operation 305, the target primary gNB triggers Xn establishment (to establish the UE's Xn tunnel between the target primary gNB and secondary gNB.). e.g. the target primary gNB sends Xn Addition Required message including UE aggregation related info to the secondary gNB. In some implementations, the UE aggregation related info includes at least one of the following: a primary UE ID, a secondary UE ID, the association between the primary UE and the secondary UE. At operation 306, the secondary gNB responses with the Xn Addition Request including UE aggregation configuration to the target primary gNB.

Operation 307: The target primary gNB sends a handover request acknowledgement to the source primary gNB.

Operations 308 and 309: The source primary gNB triggers to release the connection between the source primary gNB and the secondary gNB. At operation 308, the source primary gNB sends a Xn Release Request to release the connection between the source primary gNB and the secondary gNB. At operation 309, the secondary gNB sends a Xn Release Request Acknowledgement to the source primary gNB.

Operation 310: The source primary gNB sends RRCReconfiguration to the primary UE to trigger the primary UE to handover from the source primary gNB to the target primary gNB.

Operation 311: The primary UE sends RRCReconfigurationComplete to the target primary gNB.

Operation 312: The target primary gNB sends an Xn addition complete message to the secondary gNB to indicate the handover completion of the primary UE from the source primary gNB to the target primary gNB.

Operations 313 and 314: The target primary gNB triggers the path switch procedure. At operation 313, the target primary gNB sends a path switch to an AMF. At operation 314, the AMF sends a path switch request acknowledgement to the target primary gNB.

Operation 315: The target primary gNB sends UE context release to the source primary gNB to release the Xn control resource between the source primary gNB and the secondary gNB(s).

Operation 316: The source primary gNB sends a UE context release message to the secondary gNB to release the Xn control resource between the source primary gNB and the secondary gNB(s).

The operations described above are examples only and can be modified in various manners. For example, the operations above can be reordered (e.g. the operations 305 to 309 can be performed after the operation 311. Some of the operations, e.g. the operations 315 and 316, can be omitted. Some operations are combined, e.g. the operations 315 and 316 can be combined with operations 308 and 309.

The Xn related messages (e.g. Xn addition required, Xn addition request, Xn Release Request, Xn Release Request Acknowledge, Xn Addition Complete, etc) can be S-Node related messages(S-Node addition required, S-Node addition request, S-Node Release Request, S-Node Release Request Acknowledge, S-Node Addition Complete, etc) or new defined UE specific Xn interface message.

While operations 301 to 316 have been discussed with reference to FIG. 3 for the primary UE handover procedure over the Xn interface, some changes can be made. For example, in some implementations, establishing the UE aggregation technique is performed after completing the handover procedure, unlike the implementation as shown in FIG. 3 shows that the UE aggregation technique is established during the handover procedure. In this case, some operations such as step 305, 306 and 312 are not performed during the handover procedure. The operations corresponds to 308 and 309 can be performed before or after the operation 307. While operations are depicted in the drawings in a particular order, this is the example only and should not be understood as limiting the disclosed technology. As discussed above, various changes in the order of operations can be made.

Implementation 4—Primary UE Handover Procedure Over NG Interface

Figure 4:
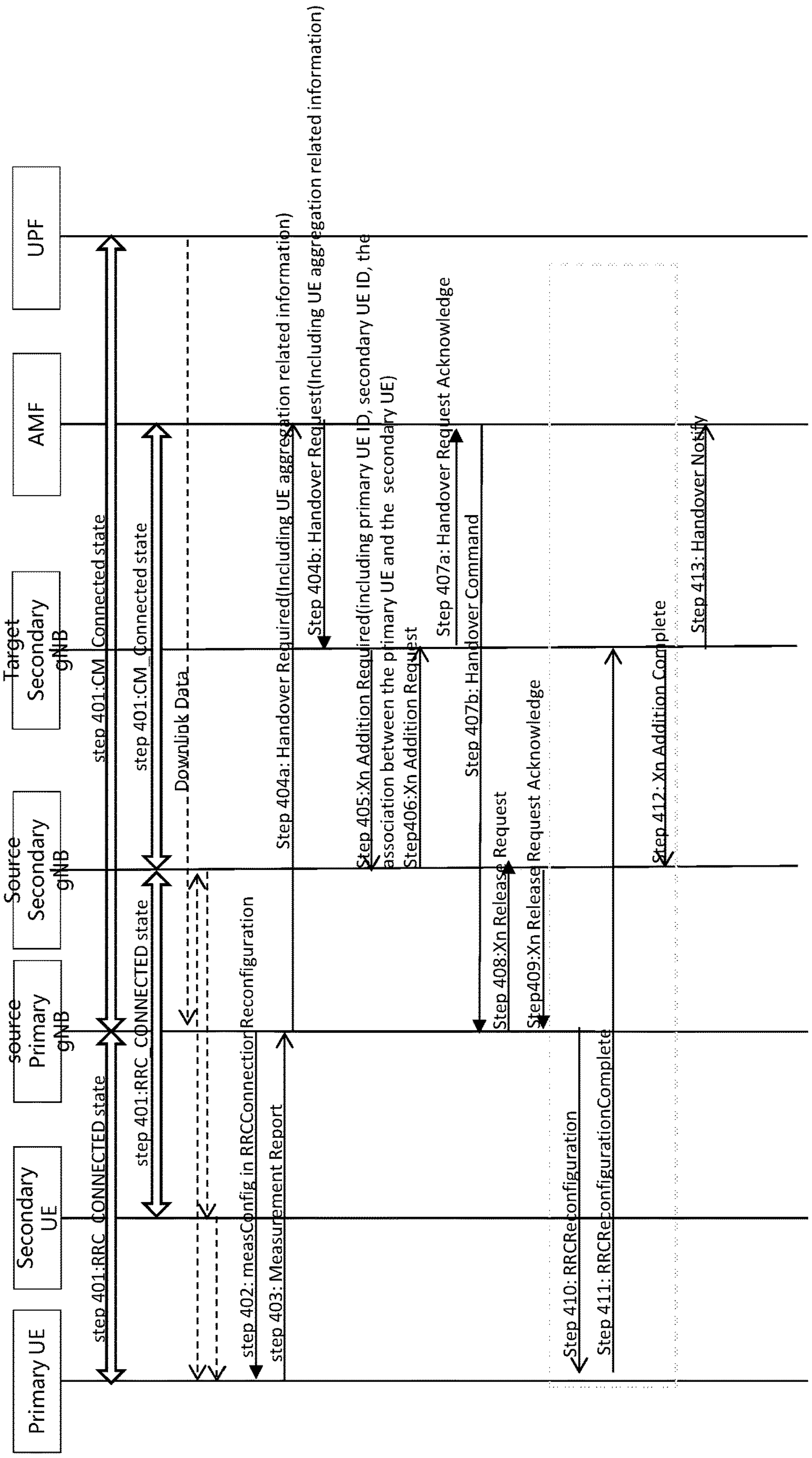
FIG. 4 shows a primary UE handover procedure over an NG interface based on some implementations of the disclosed technology.

FIG. 4 shows the primary UE handover procedure over NG interface while UE is aggregated for data transmission and/or reception. Since the primary UE handover procedure over the Xn interface has been already discussed with reference to FIG. 3, the descriptions here are focused on the differences from those of the primary UE handover procedure over the Xn interface as described with reference to FIG. 3.

Operations 401 to 403: The operations 401 to 403 are same as the operations 301 to 303 as shown in FIG. 3.

Operations 404*a* and 404*b*: At operation 404*a*, the source primary gNB sends a handover required message to AMF. At operation 404*b*, the AMF sends the handover request message to the target primary gNB. Both of the handover required message and the handover request message include the UE aggregation related information. In some implementations, the UE aggregation related information includes at least one of: a UE aggregation cause or indication, the secondary UE ID, the cell ID that the secondary UE camps, the gNB ID that the secondary UE camps, TNL address related configuration information.

Operations 405 and 406: The operations 405 and 406 are same as the operations 305 and 306 as shown in FIG. 3.

Operations 407*a* and 407*b*: The connection has been established between the secondary gNB and the target primary gNB for the secondary UE. At the operation 407*a*, the target primary gNB sends a handover request acknowledgement to the AMF. At the operation 407*b*, the AMF sends a handover command message to the source primary gNB.

Operations 408 to 412: The operations 408 to 412 are same as the operations 308 to 312 as shown in FIG. 3.

Operation 413: The target primary gNB sends a handover notification message to AMF to indicate the completion of handover.

Figure 5:
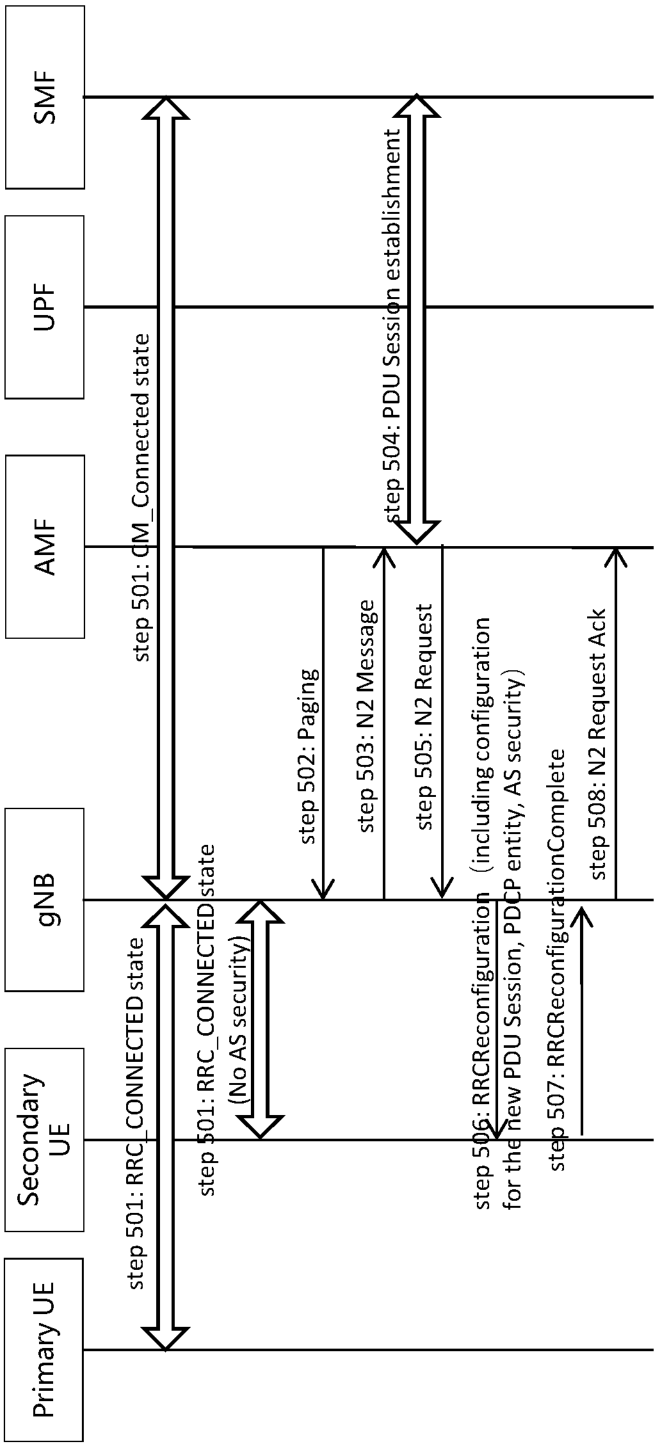
FIG. 5 shows a concurrent MT service setup for a secondary UE based on some implementations of the disclosed technology.

FIG. 5 shows the concurrent MT service setup for the secondary UE based on some implementations of the disclosed technology.

Operation 501: The data transmission and/or reception is performed using the UE aggregation technique. At the operation 501, the UE aggregation procedure has been established. The aggregation technique allows at least two UEs, e.g., the primary UE and the secondary UE, to cooperate to transmit and/or receive data. The secondary UE has RRC connection, but has not CM connection, and has not AS security established.

Operation 502: The gNB receives, from the AMF, paging for the secondary UE.

Operation 503: The gNB constructs the N2 message with MT service request cause and sends N2 message to AMF. The gNB does not send the paging to the secondary UE. The operation 503 triggers the PDU session and N2 connection establishment.

Operation 503: The PDU session establishment procedure is performed between the AMF and the SMF.

Operation 505: The N2 connection request is sent from the AMF to the gNB.

Operation 506: When the gNB receives the N2 request message, the gNB sends RRCReconfiguration including radio configuration for the new PDU Session the secondary UE. The radio configuration includes at least one of the: PDCP configuration, AS security configuration.

Operation 507: The secondary UE transmits the RRCReconfigurationComplete to the gNB.

Operation 508: The gNB transmits the N2 request acknowledgement message to the AMF.

Figure 6:
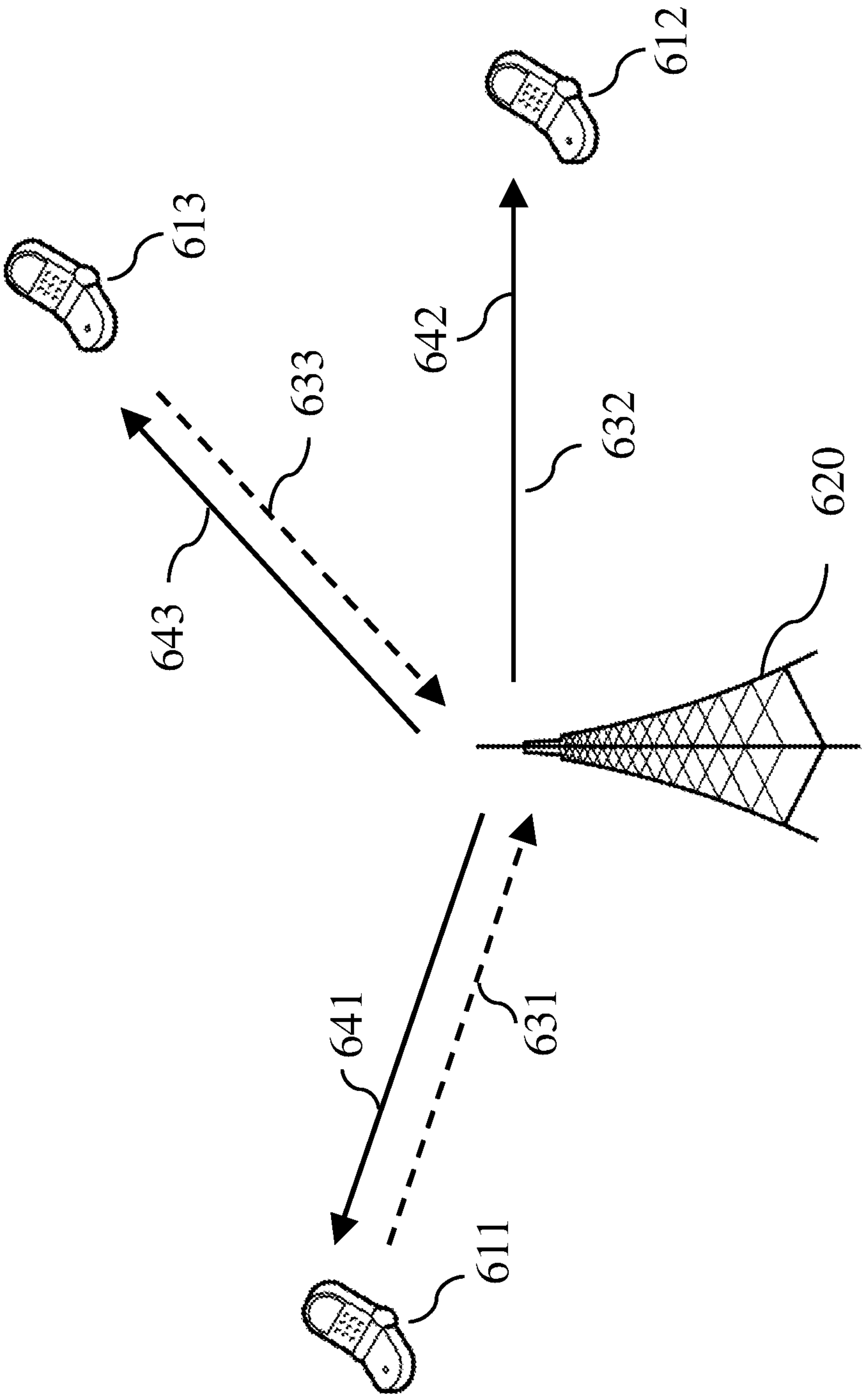
FIG. 6 shows an example of wireless communication including a base station (BS) and user equipment (UE) based on some implementations of the disclosed technology.

The implementations as discussed above will apply to a wireless communication. FIG. 6 shows an example of a wireless communication system (e.g., a 5G or NR cellular network) that includes a base station 620 and one or more user equipment (UE) 611, 612 and 613. In some embodiments, the UEs access the BS (e.g., the network) using implementations of the disclosed technology 631, 632, 633), which then enables subsequent communication (641, 642, 643) from the BS to the UEs. The UE may be, for example, a smartphone, a tablet, a mobile computer, a machine to machine (M2M) device, an Internet of Things (IoT) device, and so on.

Figure 7:
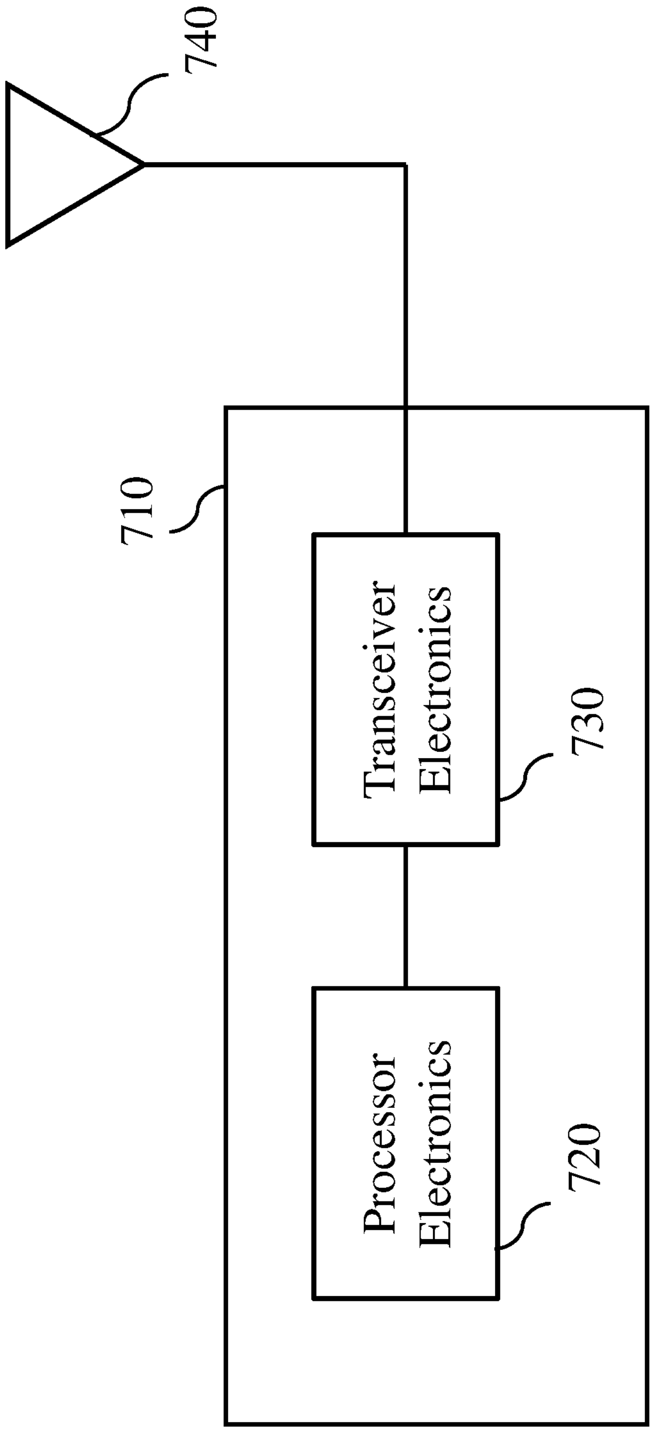
FIG. 7 shows an example of a block diagram of a portion of an apparatus based on some implementations of the disclosed technology.

FIG. 7 shows an example of a block diagram representation of a portion of an apparatus. An apparatus 710 such as a base station or a user device which may be any wireless device (or UE) can include processor electronics 720 such as a microprocessor that implements one or more of the techniques presented in this document. The apparatus 1010 can include transceiver electronics 730 to send and/or receive wireless signals over one or more communication interfaces such as antenna 740. The apparatus 710 can include other communication interfaces for transmitting and receiving data. The apparatus 710 can include one or more memories (not explicitly shown) configured to store information such as data and/or instructions. In some implementations, the processor electronics 720 can include at least a portion of transceiver electronics 730. In some embodiments, at least some of the disclosed techniques, modules or functions are implemented using the apparatus 710.

Additional features of the above-described methods/techniques that may be preferably implemented in some implementations are described below using a clause-based description format.

Figure 8:
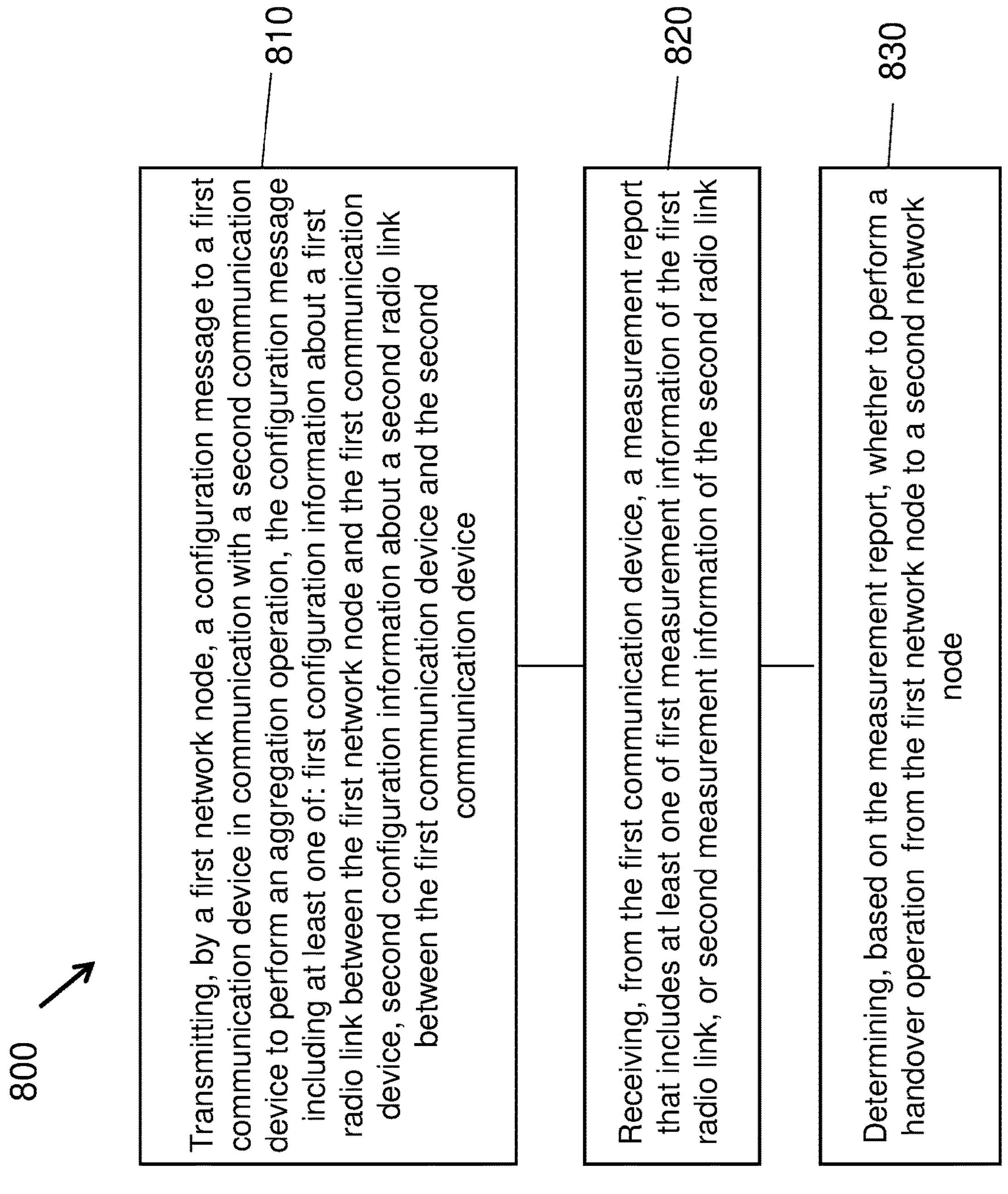
FIGS. 8-10 illustrate flowcharts showing example methods of wireless communication based on some implementations of the disclosed technology.

1. A method of wireless communication (e.g., method 800 as shown in FIG. 8), comprising: transmitting 810, by a first network node, a configuration message to a first communication device in communication with a second communication device to perform an aggregation operation, the configuration message including at least one of: first configuration information about a first radio link between the first network node and the first communication device, second configuration information about a second radio link between the first communication device and the second communication device; receiving 820, from the first communication device, a measurement report that includes at least one of first measurement information of the first radio link, or second measurement information of the second radio link; and determining 830, based on the measurement report, whether to perform a handover operation from the first network node to a second network node.

2. The method of clause 1, wherein the first communication device corresponds to a primary communication device connected with an application layer or data network or the first communication device corresponds to a secondary communication device assisting the primary communication device to perform the aggregation operation.

3. The method of clause 1, wherein the configuration message is directly transmitted from the first network node to the first communication device.

4. The method of clause 1, wherein the configuration message is indirectly transmitted from the first network node to the first communication device via the second communication device and a third network node serving the second communication device.

5. The method of clause 1, wherein the first configuration information includes measurement configuration to control a mobility of the first communication device.

6. The method of clause 1, wherein the second configuration information includes at least one of: a quality threshold value, a quality hysteresis, or a timer to evaluate the second radio link.

7. The method of clause 1, wherein the configuration message further includes a neighbor cell list including information of cells supporting the aggregation operation.

8. The method of clause 1, wherein the determining determines to remove the first communication device from performing the aggregation operation in case that the measurement report indicates that the second radio link has a quality less than a predetermined level.

9. The method of clause 1, wherein the determining determines to perform the handover operation in case that the measurement report indicates that a quality of a radio link between the first communication device and the second network node is better than that of the first radio link, and the second radio link has a quality not less than a predetermined level.

10. The method of clause 1, further comprising: in response to the determining to perform the handover operation, sending, to the second network node, a handover request message including aggregation information that includes at least one of: an aggregation cause or an aggregation indication, an identification (ID) of the first communication device, an identification (ID) of the second communication device, a cell ID that the first communication device camps, a cell ID that the second communication device camps, an ID of the first network node, an ID of the second network node, transport network layer (TNL) address related configuration information of the first communication device, or transport network layer (TNL) address related configuration information of the second communication device.

11. The method of clause 1, further comprising: in response to the determining to perform the handover operation, transmitting, by the first network node, a reconfiguration message to trigger the first communication device to handover from the first network node to the second network node.

12. The method of clause 1, further comprising: in response to the determining to perform the handover operation, transmitting, to an access and mobility management function (AMF), a handover required message including aggregation information that includes at least one of: an aggregation cause or an aggregation indication, an identification (ID) of the first communication device, an identification (ID) of the second communication device, a cell ID that the first communication device camps, a cell ID that the second communication device camps, an ID of the first network node, an ID of the second network node, transport network layer (TNL) address related configuration information of the first communication device, or transport network layer (TNL) address related configuration information of the second communication device.

Figure 9:
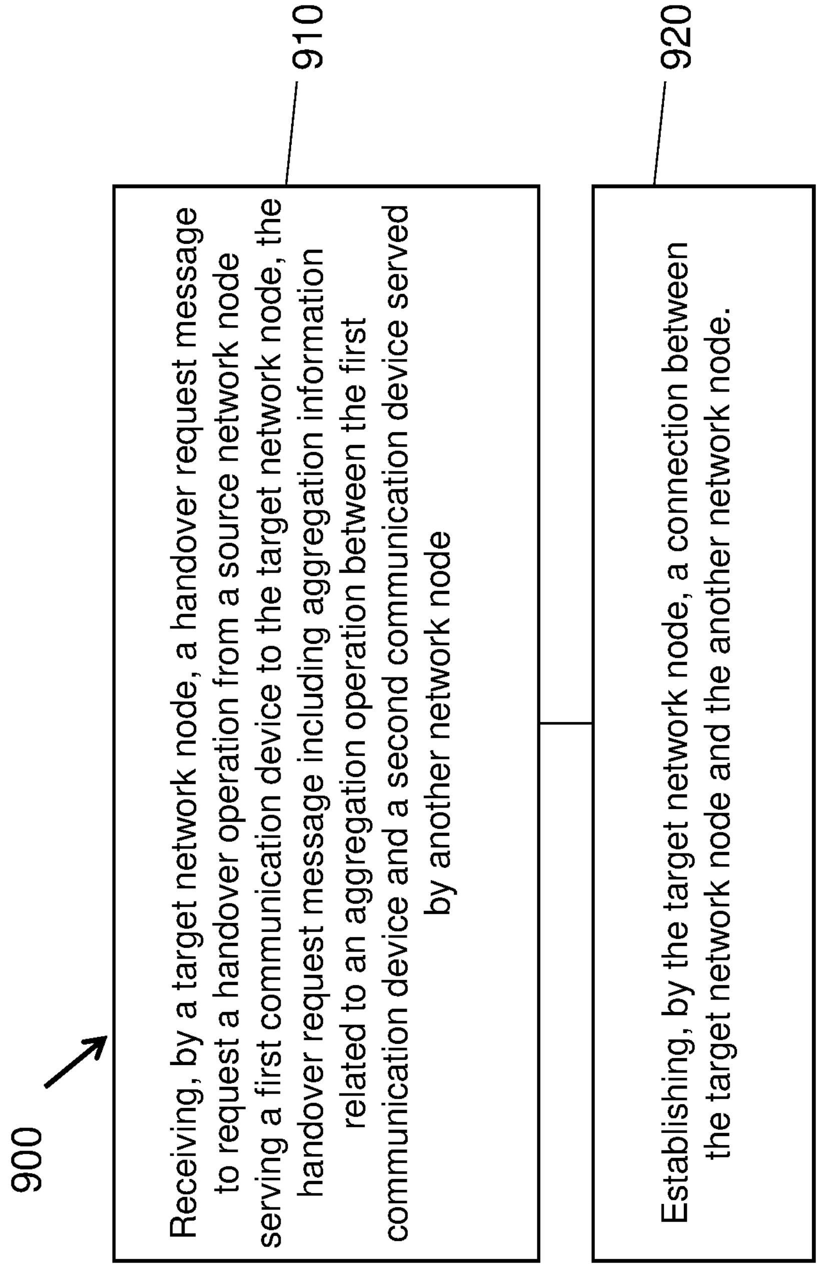

13. A method of wireless communication (e.g., method 900 as shown in FIG. 9), comprising: receiving 910, by a target network node, a handover request message to request a handover operation from a source network node serving a first communication device to the target network node, the handover request message including aggregation information related to an aggregation operation between the first communication device and a second communication device served by another network node; and establishing 920, by the target network node, a connection between the target network node and the another network node.

14. The method of clause 13, further comprising: transmitting, by the target network node to a core network device, a message that includes the aggregation information, the message indicating the first communication device in communication with a second communication device to perform an aggregation operation is configured to perform the aggregation operation as a secondary user device and/or a path does not trigger a user plain connection establishment with the core network device.

15. The method of clause 13, wherein the aggregation information includes at least one of: an aggregation cause or an aggregation indication, an identification (ID) of the first communication device, an identification (ID) of the second communication device, a cell ID that the first communication device camps, a cell ID that the second communication device camps, an ID of the first network nodes, an ID of the second network node, transport network layer (TNL) address related configuration information of the first communication device, transport network layer (TNL) address related configuration information of the second communication device.

16. The method of clause 13, wherein the first communication device corresponds to a primary communication device connected with an application layer or data network, or the first communication device corresponds to a secondary communication device assisting the primary communication device to perform the aggregation operation.

17. The method of clause 13, wherein the handover request message is received from the source network node serving the first communication device.

18. The method of clause 17, further comprising: transmitting, by the target network node and to the source network node, a handover request acknowledgement.

19. The method of clause 13, wherein the handover request message is received from an access and mobility management function (AMF).

20. The method of clause 19, further comprising: transmitting, by the target network node and to the AMF, a handover request acknowledgement.

Figure 10:
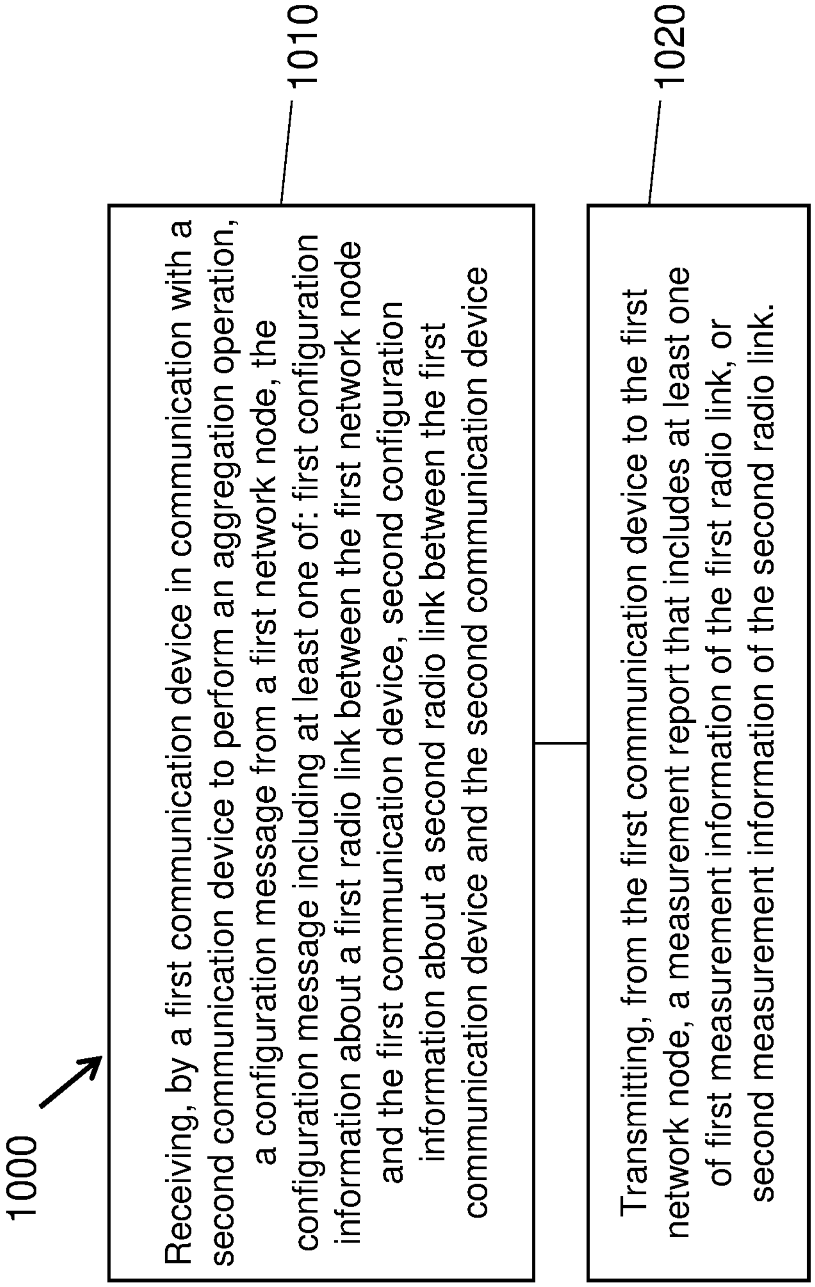

21. A method of wireless communication (e.g., method 1000 as shown in FIG. 10), comprising: receiving, by a first communication device in communication with a second communication device to perform an aggregation operation, a configuration message from a first network node, the configuration message including at least one of: first configuration information about a first radio link between the first network node and the first communication device, second configuration information about a second radio link between the first communication device and the second communication device; and transmitting, from the first communication device to the first network node, a measurement report that includes at least one of first measurement information of the first radio link, or second measurement information of the second radio link.

22. The method of clause 21, wherein the first communication device corresponds to a primary communication device connected with an application layer or data network or the first communication device corresponds to a secondary communication device assisting the primary communication device to perform the aggregation operation.

23. The method of clause 21, wherein the configuration message is directly transmitted from the first network node to the first communication device.

24. The method of clause 21, wherein the configuration message is indirectly transmitted from the first network node to the first communication device via the second communication device and a third network node serving the second communication device.

25. The method of clause 21, wherein the first configuration information includes measurement configuration to control a mobility of the first communication device.

26. The method of clause 21, wherein the second configuration information includes at least one of: a quality threshold value, a quality hysteresis, or a timer to evaluate the second radio link.

27. The method of clause 21, wherein the configuration message further includes a neighbor cell list including information of cells supporting the aggregation operation.

28. The method of clauses 1 to 27, wherein the handover operation occurs over an Xn interface or an NG interface.

29. A communication apparatus comprising a processor configured to implement a method recited in any one or more of clauses 1 to 28.

30. A computer readable medium having code stored thereon, the code, when executed, causing a processor to implement a method recited in any one or more of clauses 1 to 28.

It is intended that the specification, together with the drawings, be considered exemplary only, where exemplary means an example and, unless otherwise stated, does not imply an ideal or a preferred embodiment. As used herein, the use of "or" is intended to include "and/or", unless the context clearly indicates otherwise.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of wireless communication, comprising:

transmitting, by a first network node, a configuration message to a first communication device configured to communicate with a second communication device, the configuration message including at least one of: first measurement configuration information about a first radio link between the first network node and the first communication device, second measurement configuration information about a second radio link between the first communication device and the second communication device, wherein the first communication device and the second communication device are aggregated to implement a UE aggregation by cooperating to transmit or receive data;

receiving, by the first network node, from the first communication device, a measurement report that includes at least one of first measurement information of the first radio link, or second measurement information of the second radio link;

determining, by the first network node, based on the measurement report, whether the first network node performs a handover operation from the first network node to a second network node, the handover operation providing a connection between the first communication device and the second network node, and in response to the determining to perform the handover operation, sending, by the first network node, to the second network node, a handover request message including an aggregation related information including a UE aggregation indication indicating the UE aggregation, an identification (ID) of the first communication device, and an ID of the second communication device.

2. The method of claim 1, wherein the first communication device corresponds to a primary communication device connected with an application layer or data network or the first communication device corresponds to a secondary communication device assisting the primary communication device to perform the UE aggregation.

3. The method of claim 1, wherein the configuration message is directly transmitted from the first network node to the first communication device, or wherein the configuration message is indirectly transmitted from the first network node to the first communication device via the second communication device and a third network node serving the second communication device.

4. The method of claim 1, wherein the first measurement configuration information includes measurement configuration to control a mobility of the first communication device, and wherein the second measurement configuration information includes at least one of: a quality threshold value, a quality hysteresis, or a timer to evaluate the second radio link.

5. The method of claim 1, wherein the configuration message further includes a neighbor cell list including information of cells supporting the UE aggregation.

6. The method of claim 1, wherein the determining determines to perform the handover operation in case that the measurement report indicates that a quality of a radio link between the first communication device and the second network node is better than that of the first radio link, and the second radio link has a quality not less than a predetermined level.

7. The method of claim 1, wherein the aggregation information further includes at least one of: an aggregation cause, a cell ID that the first communication device camps, a cell ID that the second communication device camps, an ID of the first network node, an ID of the second network node, transport network layer (TNL) address related configuration information of the first communication device, or transport network layer (TNL) address related configuration information of the second communication device.

8. The method of claim 1, further comprising: in response to the determining to perform the handover operation, transmitting, by the first network node, a reconfiguration message to trigger the first communication device to handover from the first network node to the second network node, transmitting, to an access and mobility management function (AMF), a handover required message including the aggregation related information that further includes at least one of: an aggregation cause, a cell ID that the first communication device camps, a cell ID that the second communication device camps, an ID of the first network node, an ID of the second network node, transport network layer (TNL) address related configuration information of the first communication device, or transport network layer (TNL) address related configuration information of the second communication device.

9. The method of claim 1, wherein the handover operation occurs over an Xn interface or an NG interface.

10. A method of wireless communication, comprising:

receiving, by a first communication device configured to communicate with a second communication device, a configuration message from a first network node, the configuration message including at least one of: first measurement configuration information about a first radio link between the first network node and the first communication device, second measurement configuration information about a second radio link between the first communication device and the second communication device, wherein the first communication device and the second communication device are aggregated to implement a UE aggregation by cooperating to transmit or receive data; and transmitting, from the first communication device to the first network node, a measurement report that includes at least one of first measurement information of the first radio link, or second measurement information of the second radio link, wherein, for the first communication device, a handover request message to request to perform a handover operation from the first network node to a second network node is sent by the first network node to the second network node, the handover request message, the handover operation providing a connection between the first communication device and the second network node and the handover request message including an aggregation related information including a UE aggregation indication indicating the UE aggregation, an identification (ID) of the first communication device, and an ID of the second communication device.

11. The method of claim 10, wherein the first communication device corresponds to a primary communication device connected with an application layer or data network or the first communication device corresponds to a secondary communication device assisting the primary communication device to perform the UE aggregation.

12. The method of claim 10, wherein the configuration message is directly transmitted from the first network node to the first communication device, or wherein the configuration message is indirectly transmitted from the first network node to the first communication device via the second communication device and a third network node serving the second communication device.

13. The method of claim 10, wherein the first configuration information includes measurement configuration to control a mobility of the first communication device, and wherein the second configuration information includes at least one of: a quality threshold value, a quality hysteresis, or a timer to evaluate the second radio link.

14. The method of claim 10, wherein the configuration message further includes a neighbor cell list including information of cells supporting the UE aggregation.

* * * * *